Jan. 21, 1964     R. B. FERTIG     3,119,103
CONTINUOUSLY SELF-CHECKING SCANNER ALARM SYSTEM
Filed Jan. 3, 1961     2 Sheets-Sheet 1

INVENTOR.
RAYMOND B. FERTIG
BY Howard K. Kothe

ATTORNEY

United States Patent Office 3,119,103
Patented Jan. 21, 1964

3,119,103
CONTINUOUSLY SELF-CHECKING SCANNER ALARM SYSTEM
Raymond Baines Fertig, St. Albans, W. Va., assignor to Union Carbide Corporation, a corporation of New York
Filed Jan. 3, 1961, Ser. No. 80,470
9 Claims. (Cl. 340—214)

The present invention relates to a novel scanner alarm system incorporating a circuit for continuously checking the operability of all of the components of the scanner system. More particularly, it relates to such a device utilizing the scanner synchronizing signal for initiating the self checking sequence.

Multi-point display apparatus has wide and varied uses in modern industrial plants. Such apparatus may be used to provide a continuous display of conditions existing throughout a long and involved process. It may, for example, be used to indicate pressures or temperatures existing along a long length of reactor tubing in a chemical process or to display stresses and strains at various points upon a test model.

One of the most widely used data display means is the cathode ray oscilloscope. Data from a desired number of points is fed first through a scanning switch and from there to the amplifier of the oscilloscope. The signal is amplified and applied to the vertical deflection plates of the oscilloscope. By proper adjustment of the horizontal sweep speed, the measured quantities are shown as bars of light at various heights along the face of the screen.

An example of the use of such data display equipment would be the display of temperatures throughout the length of a long reactor tubing in chemical process plants. By the insertion of thermocouples at desired intervals along a length of tubing, signal voltages proportional to the temperatures at each point are available. It is then an easy matter to feed these voltages through a scanner switch and thence to the oscilloscope amplifier. Often, however, it is not sufficient to have visual display alone of the quantities which are being measured. With increased emphasis on the benefits to be obtained from automation, it is often desired to utilize such data display apparatus for control or alarm purposes. Manufacturers of this type of equipment normally provide apparatus capable of such adaptation by providing separate relays and amplifiers for each of the several measured points. It will be immediately obvious that such instruments rapidly assume major proportions in both size and expense. This is especially true when a large number of sample points are utilized.

The necessity of a large number of sample points is well illustrated by the high pressure, high temperature reaction process of producing ethylene polymers. By such process, resins are produced at elevated pressures and temperatures in the presence of any one of a large number of different catalysts. In U.S. Letters Patent 2,153,553 operating conditions in excess of 500 atmospheres to as high as 20,000 atmospheres and temperatures between about 100° C. and 400° C. were first disclosed as being suitable for producing solid polyethylene when oxygen is used as a catalyst. In such processes there is an occasional process malfunction causing high temperature or high pressure areas to form at a given spot in the reaction system. This causes pyrolysis and carbon formation which may either spread to the rest of the system if the condition is not altered immediately or at the very least contaminate many pounds of valuable resin. It has been found that if these trouble areas can be detected in time and the product in the immediate area rejected from the system before reaching the resin receptacle such contamination can be avoided. Success of such a reject system was thus found to hinge on the development of control apparatus capable of continuously and virtually simultaneously monitoring a large number of thermocouples located throughout the process flow system with such precision and speed that a temperature increase of a fraction of a second observed by any one of the thermocouples would trigger the required response.

One type of scanning and monitoring apparatus capable of such control whereby a large number of thermocouples can be continuously and rapidly scanned comprises a high speed scanning switch inserted between a high gain amplifier and the output leads of special high pressure thermocouples. The amplifier output is fed directly to the vertical deflection plates of an oscilloscope so that a profile of temperatures along the axis of a reactor tube is displayed. The temperature display consists of a short horizontal line on the screen of the oscilloscope corresponding to each of the thermocouple reference points. The high speed scanning switch is a commercial mercury jet switch which provides fast make and break contact between the amplifier input and the thermocouple leads at a rate such that each thermocouple is sampled 60 times per second.

To utilize the scanner and amplifier as a control apparatus, the amplifier output is fed to a thyratron which is biased to a critical cutoff level. When one of the thermocouples indicates a momentary high temperature disturbance of a value sufficient to indicate that a decomposition is taking place, the amplifier output exceeds the cutoff bias of the thyratron tube and causes same to conduct. The current in the thyratron tube plate circuit activates a product-diversion valve to reject the product then in the reactor and vent said product to the atmosphere or other receptacle. Thus further unwanted reaction and contamination of other product resin is prevented. Such apparatus has been used successfully for some time in commercial operation and thus makes it possible to control a product diversion valve by an instantaneous high temperature peak which may occur at any one of innumerable reference points in the reactor flow stream. However, there has previously been no satisfactory method of or apparatus for continuously checking the operability of the scanner and monitoring systems. As presently utilized, failure of the scanner switch, amplifier or thyratron tube would go undetected with subsequent loss of control.

It is accordingly the primary object of the present invention to provide a continuously self-checking fail safe scanner alarm system.

It is a further object to provide such a system which also continually checks the fail safe checking circuit.

It is a still further object to provide such a system which utilizes the scanner system synchronizing pulse to develop a test signal and gating control pulse.

Other objects and advantages will be apparent from the following description and drawings in which.

Figure 1:
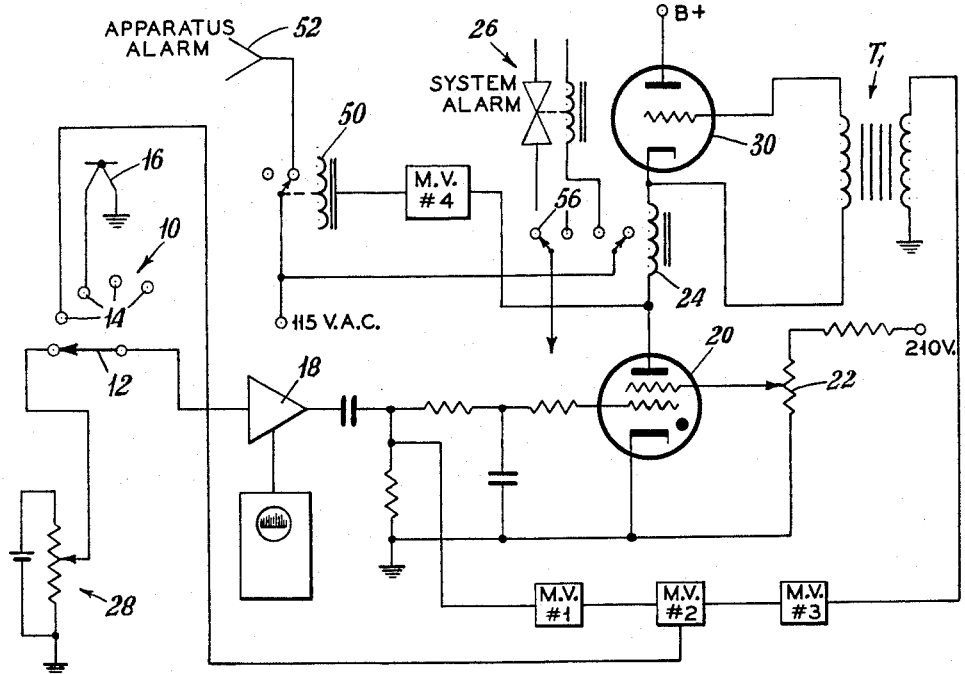
FIG. 1 is a combination block and schematic drawing of a preferred embodiment of the invention.

The objects of the present invention are accomplished in general by the combination of a scanner alarm system and a self-checking circuit therefor. The scanner alarm system comprises a scanner switch having a rotary contactor and a plurality of contacts, a plurality of electrical signal sources for supplying signals of a first polarity to separate contacts of the switch, and means for supplying a synchronizing pulse of opposite polarity to that of the electrical signals to one of the contacts. The output from the scanner switch contactor is supplied to a thyratron tube which is biased to conduct whenever one of the electrical signals exceeds a predetermined value. A means in the thyratron tube circuit is provided which means is operable to produce an indication or perform a control function when the thyratron tube conducts for longer than a predetermined time. The self checking circuit for use in combination with the scanner alarm system comprises a first pulse generator means connected to the scanning switch contactor for producing an output pulse upon receipt of an alternate synchronizing pulse. A second pulse generating means is connected to the output of the first pulse generating means which produces, upon receipt of a pulse, a test pulse of the same polarity as the said electrical signals and of a magnitude sufficient to cause the thyratron to conduct, which pulse is fed to one of the contacts of the scanner switch; and a gate pulse delayed a predetermined time with respect to the test pulse. The gate pulse is fed to a third pulse generating means which supplies a reset pulse to a reset means in the thyratron tube circuit, said reset pulse being operative to stop conduction in the thyratron tube said predetermined time after it is initiated by the test pulse. The conduction of the thyratron tube for said predetermined time is insufficient to actuate the aforementioned indicating and control means. Further means are connected in the thyratron tube circuit for producing a "safe indication" output as long as the thyratron tube conducts in response to the test pulses.

Thus, a test pulse is produced by the self-checking circuit every other revolution of the scanning switch, which test pulse causes the thyratron tube to conduct. However, before the indicating or control means of the scanner system can be actuated, a gate pulse, also provided by said self-checking circuit, causes the thyratron tube to be shut off. A monitoring means in addition to the scanner alarm, also located in the thyratron output circuit, detects whether or not the test pulses are causing the thyratron tube to conduct properly and provides a warning signal in case of a failure. The fail safe or self-checking circuit of the instant invention works in combination with the scanner system and does not in any way affect its normal function of checking for an abnormal condition indicated by one of the plurality of sampled signals. The circuit will indicate a fault in the event of non-operability of the scanner switch, failure of the thyratron tube and/or discontinuities in any of the wires or circuit components of the scanner. In addition it will automatically give a failure indication when any one of its own components fails.

In the preferred embodiment of the invention illustrated, the pulse generating means utilized in the "self-checking" circuit comprise simple one shot multivibrators which are designed to have the proper time constants to provide the results desired, i.e., pulse width.

The invention will now be more particularly described with reference to the drawings wherein FIG. 1 shows a scanner alarm system which includes a high speed scanning switch 10 having a rotary contactor 12 and a plurality of contacts 14 which may be, for example, 30 in number. A plurality of thermocouples 16 are connected respectively to each of all but two of these contacts. While thermocouples are illustrated, some other signal source could equally well be used. The output from the scanning switch 10 is fed to an amplifier 18 which may conveniently be the vertical amplifier of an oscilloscope which is often used as a display device with the instant scanner system. The output from the amplifier is fed through a suitable input filter to a thyratron tube 20 which may be adjustably biased by potentiometer 22 so that the tube will fire when an input signal exceeds a predetermined value. In the specific embodiment disclosed, this value would be that resulting when the temperature at some point in the process stream exceeds a safe level and product degradation occurs. A relay 24 in the plate circuit of the thyratron has one pair of contacts located in an alarm circuit 26 so that when the thyratron tube conducts the relay will energize an alarm and/or a process control mechanism. It will of course be understood that the relay can be utilized to control the process or reject a portion of the product located in the portion of the flow stream being monitored. This relay is also conveniently provided with another set of contacts for deactivating the self-checking or fail-safe circuit as will be explained later.

The relay 24 is chosen so that the tube 20 must conduct a predetermined minimum time for said relay to activate its associated contacts. A suitable time has been found to be two to three times the time required for the rotary contactor 12 to move from one contact to the next adjacent contact. The significance of this time delay will be subsequently pointed out.

As stated previously, the scanning switch used is normally a mercury switch utilizing a mercury jet as the contactor. This switch is preferably rotated at a speed of approximately 60 revolutions per second. Thus the contacts are scanned each 60 times a second.

In known systems of this type, since the thyratron 20 is normally not conducting, there is no way of knowing whether it is capable of firing except by manually injecting a test signal into the scanning switch. This is the normal procedure used by operating personnel; however, if the thyratron fails at any time after the test has been performed, there is no way of knowing about it until the unit is checked again. During this time, the system being monitored could be operating without the protection of this apparatus. Other components in the scanner-alarm system can also fail but they can usually be detected by observing the pattern on the indicator, usually an oscilloscope. However, this requires close observation of the oscilloscope by the operating personnel. The present invention remedies this situation by providing an alarm when any component in the scanner-alarm system fails.

Normally a synchronizing signal of about 15 millivolts of opposite polarity to the thermocouple signals is produced by circuit 28 and is connected to the first contact on the scanning switch 10 for the purpose of locking in the horizontal sweep on the oscilloscope. This signal, after being amplified by the vertical amplifier 18 of the oscilloscope, is also used to trigger the fail safe circuitry of the present invention which circuitry includes four multivibrators and a series reset tube 30. The first multivibrator is triggered by this signal and serves as a frequency divider to prevent a true reject signal from being reset as will be explained later. The second multivibrator is triggered by the first multivibrator and is used as a pulse generator, said pulse is connected back to the second contact on the scanning switch to serve as a test signal. The polarity of this signal is opposite to the synchronizing signal and of sufficient magnitude to cause the thyratron to fire. After the second multivibrator completes its cycle, it fires the third multivibrator which in turn momentarily cuts off the normally conductive series reset tube 30 in the plate circuit of the thyratron, causing the thyratron to cease conducting, after which the reset tube returns to its normal condition. The thyratron tube is now ready for an alarm signal or the next test pulse, whichever occurs first. As stated previously, the relay 24 in the plate circuit of the thyratron is not fast enough to follow the fire-reset cycle of this tube which amounts to about 250 microseconds, hence the control relay is not actuated by the firing of the thyratron by the test pulse. The fourth multivibrator is used to monitor the firing and blocking of the thyratron tube by the test pulse and is triggered by a pulse from the plate circuit of this tube. The output of the fourth multivibrator is preferably rectified and used to hold out a D.C. relay. Thus, if any component in the scanner-alarm system or the fail safe circuitry fails, this relay will "fall in" and can be used to sound an alarm or perform a control function. A true alarm signal from a thermocouple 26 will operate the control relay 24 and alarm circuit 26 because there is sufficient time between test cycles for the relay to operate as provided by the first multivibrator which causes $1/30$ of a second to elapse between test pulses since it only operates or produces an output pulse through the second multivibrator for every other synchronizing signal.

It will be understood that the fourth multivibrator is merely a preferred appartus for monitoring the output of the thyratron and operates to provide a "hold out" voltage for operating a normally closed relay as long as the thyratron responds to the 30 c.p.s. test signal.

Thus, the present invention provides a means for continuously checking the operability of such a scanner alarm system without in any way affecting the operability of said system. In utilizing the synchronizing pulse normally provided in such a system it develops a test pulse for firing the thyratron tube and a gate pulse for blocking and resetting said tube before the normal alarm can be actuated.

Figure 3:
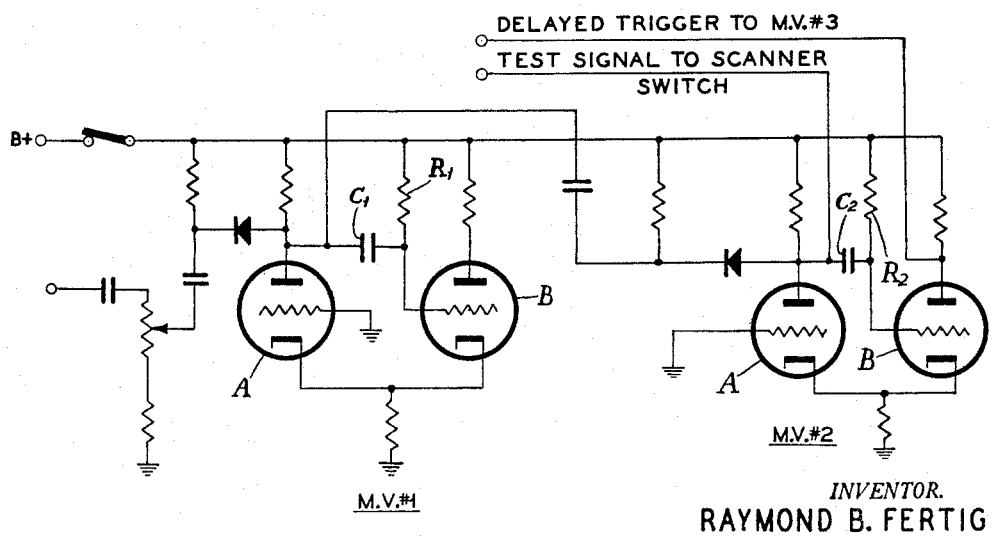
FIG. 3 is a schematic of M.V.'s 1 and 2.

The multivibrators numbered 1 through 4 are all of the one shot self-blocking type as will be understood by any person skilled in the art. FIG. 3 shows a schematic diagram of M.V. #1 and M.V. #2. It will be noted that they are virtually identical, the only difference being the size of the resistance capacitance network marked $C_1$, $R_1$, and $C_2$, $R_2$, respectively in the drawing whose R.C. time constant determines the reset time for the multivibrator and thus the duration of the output pulse therefrom.

Figure 2:
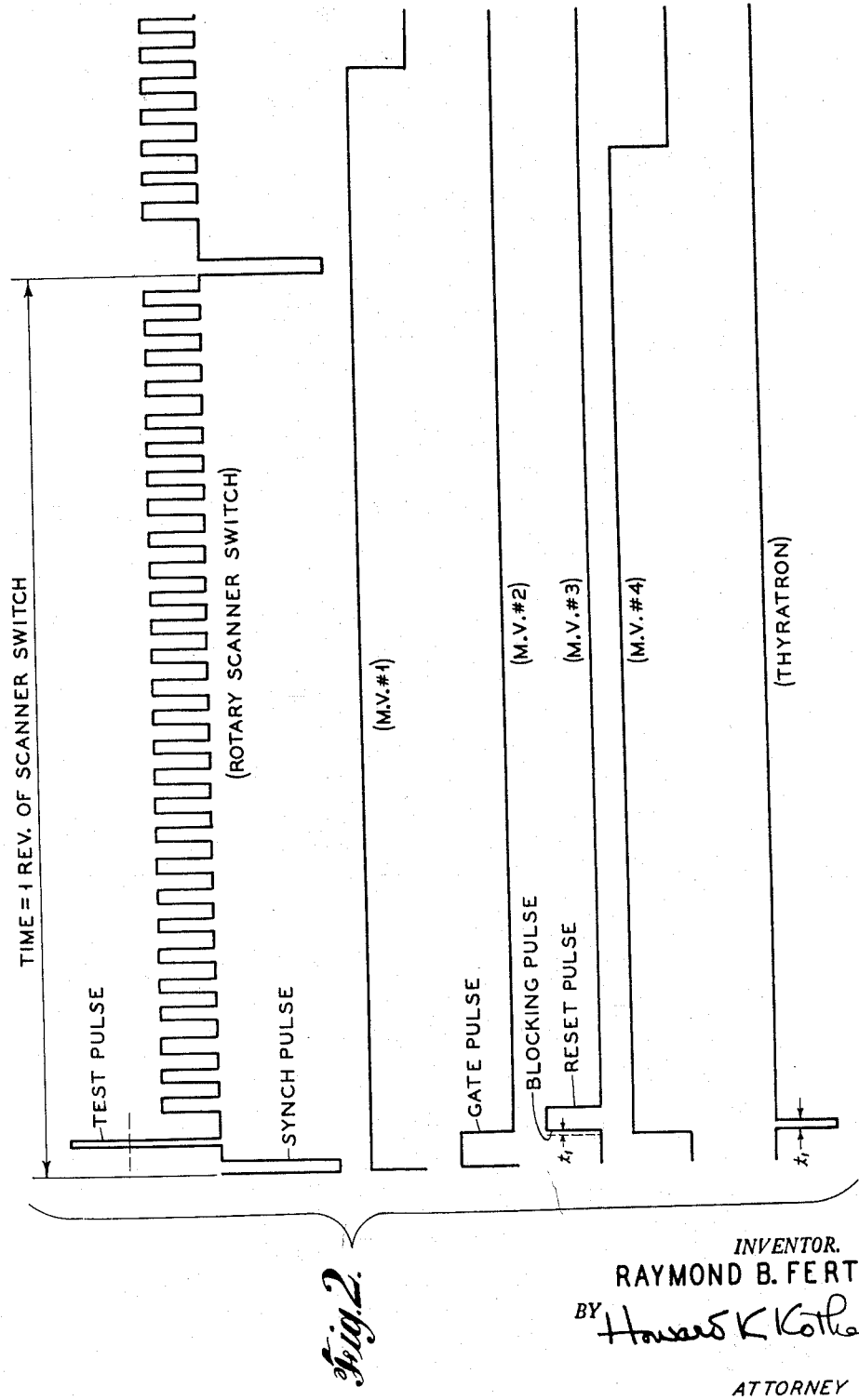
FIG. 2 is a series of wave forms taken at various points in the circuit shown in FIG. 1 illustrative of the operation of the device.

Referring now to the waveforms of FIG. 2, a typical operating cycle of the present invention will be described. The first waveform illustrates the output of the rotary scanner switch 10. The synchronizing pulse is clearly shown and indicated and will be seen to have an opposite polarity to that of the test pulse and thermocouple signals. The test pulse picked up on the switch contact adjacent to the synchronizing signal contact is clearly indicated. Its amplitude will be seen to be greater than the other "normal" signals from the thermocouples. It will be noted that the distance between synchronizing pulses corresponds to one revolution of the scanner switch and that on the beginning of the next cycle there is no test pulse as described above. This is done so that if a process fault as detected by a thermocouple should occur at a point just before the synchronizing pulse, the reset mechanism of the instant self-checking circuit will not reset the thyratron before the relay 24 has time to actuate the alarm system 26 on alternate scans.

As a synchronizing signal is received from the scanner switch 10 and amplifier 18, multivibrator one (M.V. 1) fires and supplies a pulse to multivibrator two (M.V. 2). It will be noted in the waveform for M.V. #1 that the multivibrator does not reset or return to its unfired condition until after the occurrence of a second synchronizing pulse. This is done by suitably selecting the values of R and C, as will be understood by a person skilled in the art. With such a reset time M.V. #1 will produce a pulse only on alternate synch pulses since it is able to fire only when in said unfired condition.

The output pulse from M.V. #1 triggers M.V. #2 whose output is illustrated in waveform 3. The output from the plate of tube A of M.V. #2 provides the test pulse supplied to the scanner switch 10 and amplifier 18, which in turn causes the thyratron to fire at a time corresponding to the leading edge of the pulse shown in waveform 6. A second delayed pulse is taken from tube B of M.V. #2 corresponding in time to the trailing edge of the pulse of waveform 3 which acts as a gate pulse to fire M.V. #3 whose output is represented in waveform 4. This pulse is fed through isolating transformer $T_1$ to the gate tube 30 which acts as a switch in the thyratron plate circuit. The leading edge of this pulse biases the tube 30 to cutoff and thus cuts off the thyratron which was fired by the test pulse. The dotted line in waveform 4 indicates the time at which the thyratron began to conduct in response to the test pulse and the time $t_1$ is the time during which the thyratron tube conducts. This time is also indicated diagrammatically in waveform 6. The trailing edge of the pulse from M.V. #3 resets the tube 30 so that it now represents a closed circuit in the thyratron plate circuit so that the thyratron can now respond to a system fault as sensed by the thermocouples.

As stated previously, the time $t_1$ during which the thyratron is fired by the test circuit is insufficient to actuate the system fault indicator or control device 26. For the instant application, this time $t_1$ is about 250 microseconds. However, as will be obvious, the maximum desirable test conduction time $t_1$ would vary with a different sweep speed of the scanner switch, number of contacts of said switch, and the response time of the device 24, it being remembered that the time $t_1$ should be considerably less than the response time of relay 24.

The output of the thyratron is then fed to a device capable of energizing a hold out relay which prevents the "apparatus failure" alarm 52 from being energized as long as the thyratron responds to a test pulse thirty times a second (or whatever the test pulse repetition frequency happens to be). A properly designed A.C. relay could perform this function. However, in the preferred embodiment of the invention, the thyratron pulses are fed to a fourth multivibrator (M.V. #4) which is designed to produce a long duration pulse which is rectified, filtered and ultimately utilized to actuate a D.C. relay which accomplishes the desired purpose. Thus, if the pulses from the thyratron should cease, there will be no output from M.V. #4 which will in turn cause the hold out relay 50 to close thus energizing apparatus alarm 52 to signify a fault in the scanner alarm system. The system is also self clearing in that if the system should fail momentarily due to a dirty contact or some inconsequential temporary malfunction, the alarm would be actuated for only $\frac{1}{30}$ of a second at which time the thyratron would again respond properly to the test pulses and reopen relay 50.

Conversely, to prevent resetting of a true "system" fault by the fail safe system, means are provided in the scanner alarm system to automatically deactivate the fail safe circuit when a system fault is detected. This is preferably done by providing a second set of contacts 56 on the system fault relay 24 in the plate circuit of the thyratron 20 which are normally closed and supply B+ to the fail safe circuit. Thus, when a true system fault causes the thyratron tube to conduct and energize relay 24, the contacts 56 open and remove B+ from the multivibrators thus deactivating said fail safe circuit and preventing resetting of the thyratron tube by gate tube 30.

It may be seen that the instant fail safe circuit is very simple, is continuously self-checking, and can be incorporated in such a system scanner alarm device with very little modification of said device. Moreover, it will give an alarm upon the occurrence of any fault in the scanner alarm device which would cause the thyratron not to fire. As stated previously this would include failure of the thyratron tube, its power supply, the scanner switch, the amplifier, any circuit discontinuity, and any failure of the fail-safe circuit itself.

As stated previously, in the preferred embodiment of the invention, a test pulse is produced only on alternate scans of the switch 10 to avoid resetting a true alarm signal from the two or three contacts just preceding the synchronizing and test signal contacts. However, the same results could equally well be obtained by leaving these contacts open, i.e., no thermocouples connected thereto and adjusting M.V. #1 to fire on every synch pulse. Other similar modifications and substitutions could be made by a person skilled in the art without departing from the spirit and scope of the invention.

What is claimed is:

1. In a scanner alarm system whihch comprises a scanner switch having a rotary contactor and a plurality of contacts, a plurality of electrical signal sources for supplying signal of a first polarity to separate contacts of the switch, means for supplying a synchronizing pulse of opposite polarity to that of the electrical signals to one of the contacts, means feeding the output from the scanner switch contactor to a thyratron tube which is biased to conduct whenever one of the electrical signals exceeds a predetermined value, and means in the thyratron tube circuit operable to provide an indication when the tube conducts for longer than a predetermined time; the improvement which comprises a self-checking circuit for use in combination with the said scanner alarm system which comprises means in combination with the scanning switch contactor for producing a test pulse at selected times in the cycle of rotation of said scanner switch, said test pulse being operable to cause the thyratron tube to conduct, and means for interrupting the conduction of the thyratron tube said predetermined time after the test pulse causes same to conduct, said predetermined time being less than the time required for the rotary contactor to move from one contact to the next, and further means in the thyratron tube circuit for giving an "apparatus safe" indication as long as the thyratron tube fires each time a test pulse is applied thereto.

2. In a scanner alarm system comprising a scanner switch having a rotary contactor and a plurality of contacts, a plurality of electrical signal sources for supplying signals of a first polarity to separate contacts of the switch, means for supplying a synchronizing pulse of opposite polarity to that of the electrical signals to one of the contacts, means feeding the output from the scanner switch contactor to a thyratron tube which is biased to conduct whenever one of the electrical signals exceeds a predetermined value, and means in the thyratron tube circuit operable to provide an indication when the tube conducts for longer than a predetermined time, the improvement which comprises a self-checking circuit for use in combination with the said scanner alarm system which comprises a first pulse generator means connected to the scanning switch contactor for producing an output pulse upon receipt of selected ones of said synchronizing pulses a second pulse generating means connected to the output of the first pulse generating means which produces, upon receipt of a pulse therefrom, a first test pulse of the same polarity as the said electrical signals and of a magnitude sufficient to cause the thyratron to conduct, which is fed to one of the contacts of the scanner switch; and a second gate pulse delayed a predetermined time with respect to the test pulse, said gate pulse being fed to a third pulse generating means which supplies a reset pulse to a reset means in the thyratron tube circuit, said reset pulse being operable to stop conduction in the thyratron tube said predetermined time after it is initiated by the test pulse, the conduction of the thyratron tube for said predetermined time being insufficient to actuate the aforementioned indicating means; further means connected in the thyratron tube circuit for producing an "apparatus-safe" indication as long as the thyratron tube conducts in response to the test pulses.

3. A device as set forth in claim 2 above wherein the reset means in the thyratron tube circuit comprises an electron tube in the plate circuit of said thyratron which is normally biased to be conducting but wherein the reset pulse momentarily biases it to cut-off and then returns it to a normal condition.

4. A device as set forth in claim 2 wherein all of the pulse generating means are one shot multivibrators and wherein the first pulse generating means is chosen so that its reset time is greater than the time for one revolution of the scanner switch and less than two.

5. A device as set forth in claim 4 above wherein the means for producing an apparatus-safe indication includes a fourth multivibrator and a normally closed relay operated thereby which is held "open" as long as the thyratron conducts in response to the test and reset signals, and wherein means are also provided for deactivating the multivibrators when a system alarm signal causes the thyratron tube to conduct for longer than the said predetermined time.

6. In a scanner alarm system which includes a scanner switch having a rotary contactor and a plurality of contacts, a plurality of electrical signals of a first polarity supplied to separate contacts of said switch, means for supplying a synchronizing pulse of opposite polarity to said electrical signals to one of the contacts, means for amplifying the output from the scanning switch contactor and supplying same to a thyratron tube, means for biasing said thyratron tube so that when one of the electrical signals exceeds a predetermined value the tube will conduct, and "system" alarm means associated with said thyratron tube having a response time such that it will give an indication when the tube conducts for longer than a predetermined length of time; the improvement which comprises a first pulse generator means also connected to the scanning switch contactor for producing an output pulse upon receipt of alternate pulses of said opposite polarity to the electrical signals, a second pulse generating means connected to the output of the first pulse generating means for supplying, upon receipt of a pulse, a test pulse to one of the scanner switch contacts of the same polarity as the electrical signals and of a magnitude sufficient to cause the thyratron tube to conduct and for supplying a gate pulse delayed said predetermined time with respect to said test pulse to a third pulse generating means for supplying a reset pulse to a reset tube located in the thyratron tube circuit said reset pulse being operative to stop conduction in the thyratron tube said predetermined time after it is initiated by the test pulse, the conduction of the thyratron tube for said predetermined time being insufficient to actuate the aforementioned indicating means, further means connected to the output of the thyratron tube for producing an electrical output as long as the thyratron tube conducts in response to the test pulses, and means connected to the output of the last named means actuable to produce a signal when the thyratron fails to conduct in response to one of said test pulses, and wherein said predetermined time is less than the time required for the contactor of the scanning switch to move from one contact to an adjacent contact.

7. A device as set forth in claim 6 wherein the three pulse generating means are one shot multivibrators.

8. A device as set forth in claim 6 wherein the means for producing an electrical output as long as the thyratron conducts in response to the test pulses comprises a multivibrator triggered by the output pulses of said thyratron.

9. A device as set forth in claim 6 wherein no electrical signal of said first polarity is picked up by the rotary contactor for a length of time prior to the test pulse at least equal to the response time of the "system" alarm means in the thyratron tube circuit, and wherein the first pulse generating means produces an output pulse upon receipt of each synchronizing pulse.

References Cited in the file of this patent

UNITED STATES PATENTS 2,576,892    Stanton _____ Nov. 27, 1951
2,731,627    Herbst _____ Jan. 17, 1956